(12) United States Patent
Gong et al.

(10) Patent No.: US 7,378,481 B1
(45) Date of Patent: May 27, 2008

(54) HOT MELT ADHESIVES

(75) Inventors: Lie-Zhong Gong, Bridgewater, NJ (US); Dale L. Haner, Ringwood, NJ (US); Ingrid Cole, Flemington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 11/672,647

(22) Filed: Feb. 8, 2007

(51) Int. Cl.
*C08F 110/02* (2006.01)
*C08F 4/42* (2006.01)

(52) U.S. Cl. .................... 526/352; 526/160; 526/943; 526/317.1; 526/318.2

(58) Field of Classification Search ............. 526/352, 526/160, 943, 317.1, 318.2
See application file for complete search history.

(56) References Cited

U.S. PATENT DOCUMENTS

| | | | |
|---|---|---|---|
| 3,645,992 A | 2/1972 | Elston | |
| 4,937,299 A | 6/1990 | Ewen et al. | |
| 5,272,236 A | 12/1993 | Lai et al. | |
| 6,054,544 A | 4/2000 | Finlayson et al. | |
| 6,107,430 A | 8/2000 | Dubois et al. | |
| 6,319,979 B1 * | 11/2001 | Dubois et al. | 524/570 |
| 6,432,542 B1 * | 8/2002 | Tsai | 428/421 |
| 6,582,829 B1 | 6/2003 | Quinn et al. | |
| 7,125,929 B2 * | 10/2006 | Ward | 525/70 |
| 2004/0249071 A1 * | 12/2004 | McFaddin et al. | 525/70 |
| 2006/0293424 A1 * | 12/2006 | Tse et al. | 524/270 |
| 2007/0172614 A1 * | 7/2007 | Lee | 428/35.7 |

FOREIGN PATENT DOCUMENTS

| | | | |
|---|---|---|---|
| EP | 0 886 656 B1 | | 9/2001 |
| WO | WO 9726287 | | 7/1997 |
| WO | WO 97/33921 | * | 9/1997 |
| WO | WO 9733921 | | 9/1997 |

* cited by examiner

*Primary Examiner*—Ling-Sui Choi
(74) *Attorney, Agent, or Firm*—Cynthia L. Foulke; Sun Hee Lehmann

(57) ABSTRACT

A hot melt adhesive based on a functionalized metallocene polyethylene copolymer finds use in packaging applications where high heat resistance, as well as good cold tolerance, is required.

13 Claims, No Drawings

HOT MELT ADHESIVES

FIELD OF THE INVENTION

The invention relates to a low application temperature hot melt adhesives that exhibit an excellent balance of high and low temperature performance and are particularly advantageous for use in packaging applications.

BACKGROUND OF THE INVENTION

Hot melt adhesives are widely used in the packaging industry to seal cardboard cases, trays and cartons.

Many types of packaging applications require the use of an adhesive that is both heat resistant and cold tolerant. The use of hot melt adhesives is widely used in packaging industry to seal containers, e.g. cardboard cases, trays and cartons. The hot melt adhesive used to seal the containers must have good heat resistance and good cold resistance during transportation and storage. Sealed containers being transported and/or stored within a truck or rail car are exposed to very high temperatures in the summer (up to 165° F. or higher) and very low temperatures in the winter (down to about −20° F. or lower). Thus, hot melt adhesives used in packaging applications need to be strong enough such that the sealed containers will not pop open during the transportation process.

Traditional hot melt adhesives are applied onto the containers at elevated temperatures, often around 350° F. for proper application. However, high application temperature has several drawbacks, e.g. thermal degradation of adhesives, downtime due to charring of the plugged nozzles, high maintenance cost, safety hazards, high volatile organic chemicals, and high energy consumption. Hence, there is a need for a low application temperature hot melt adhesive with good heat resistance and cold resistance. The current invention addresses this need.

SUMMARY OF THE INVENTION

The invention provides a low application temperature hot melt adhesive having both good heat and cold resistance, methods of using the adhesive to bond substrates together, to close/seal cases and cartons and the like, and to articles of manufacture comprising the adhesive.

One aspect of the invention provides hot melt adhesives comprising a functionalized metallocene polyethylene copolymer as the adhesive base polymer. Preferred adhesive formulations also comprise a tackifier and a wax.

Another aspect of the invention is directed to hot melt adhesives that can be applied at about 200° F. to about 300° F. and that have high heat resistance. Encompassed are low application temperature hot melt adhesives comprising a functionalized metallocene polyethylene copolymer and, preferably, also a tackifier and a wax.

Still another aspect of the invention is directed to a method of sealing and/or making or forming a case, a carton, a tray, a box or a bag. The method comprises use of a hot melt adhesive wherein the adhesive comprises a functionalized metallocene polyethylene copolymer.

Yet another aspect of the invention is directed to an article of manufacture comprising a hot melt adhesive comprising a functionalized metallocene polyethylene copolymer. In one embodiment, the article of manufacture is a carton, case, tray or bag used for packaging products. The carton, case, tray or bag is formed using a hot melt adhesive comprising a functionalized metallocene polyethylene copolymer. The article may comprise cardboard, paperboard or other substrate that has been adhered by such hot melt adhesives. In another embodiment, the adhesive is pre-applied to the article, e.g., carton, case, tray or bag during the manufacture thereof, and prior to packaging of a product.

A further aspect of the invention is directed to packaged articles contained within a carton, case, tray or bag, in particular packaged food. The carton, case, tray or bag is manufactured and/or sealed with a hot melt adhesive comprising a functionalized metallocene polyethylene copolymer.

The invention also provides a process for bonding a substrate to a similar or dissimilar substrate comprising applying to at least one substrate a molten hot melt adhesive composition and bonding said substrates together, wherein the hot melt adhesive comprises a functionalized metallocene polyethylene copolymer.

DETAILED DESCRIPTION OF THE INVENTION

All documents cited herein are incorporated in their entireties by reference.

The use of a low application temperature hot melt adhesive with high heat resistance and, in addition, good cold resistance is important in hot filled packaging applications and when packaged goods are transported and/or stored under conditions where exposure to extreme temperatures is likely.

Metallocene polyethylene copolymers have been used in the formulation of conventionally applied (application temperature above 300° F., more typically about 350° F.) hot melt adhesives. While moderate softening point tackifiers (85° C.-120° C.) and moderate melting point waxes (130° F.-170° F.) may be used to formulate low temperature application hot melt adhesives, i.e., application temperature at about 200° F. to about 300° F., using metallocene polyethylene copolymer as the base polymer, the resulting hot melt adhesives have inadequate heat stress.

It has been discovered that low application temperature hot melt adhesives having an excellent balance of high and low temperature performance can be obtained using a functionalized metallocene polyethylene copolymer as the base adhesive polymer. Hot melt adhesives based on functionalized metallocene polyethylene copolymer may be applied at a temperature below 300° F., down to about 200° F. or even lower, and has excellent heat stress and cold adhesion performance.

Metallocene polyethylene copolymers (herein used as non-functionalized metallocene polyethylene copolymer) are obtained through polymerizing ethylene monomer with α-olefin (e.g. butene, hexene, octene) using metallocene catalytic system. Non-functionalized metallocene polyethylene copolymers are commercially available from Exxon Mobil Corporation (under the trade name Exact) or Dow Chemical (under the trade name Affinity polymer).

Functional group or functionalizing component, herein used interchangeable, is grafted onto the non-functionalized metallocene polyethylene copolymers to form a functionalized metallocene polyethylene copolymer. This process may be performed by mixing a non-functionalized metallocene polyethylene copolymer with a functionalizing component in a reactor or in an extruder. A skilled artisan understands that various functional group may be reacted with non-functionalized metallocene polyethylene copolymer to result in a functionalized metallocene polyethylene copolymer. Functional groups that can be used in the practice of the invention include acrylic acid, acetate, sulfonate, maleic anhydride, fumaric acid, and others. Useful functionalized metallocene polyethylene copolymer for the adhesives include, acrylic acid functionalized metallocene polyethylene copolymer, acetate functionalized metallocene polyethylene copolymer, sulfonate functionalized metallocene polyethylene copolymer, maleic anhydride functionalized metallocene polyethylene copolymer, and the like. In one embodiment the functionalized metallocene polyethylene copolymer is a maleic anhydride modified metallocene polyethylene copolymer. In another embodiment the functionalized metallocene polyethylene copolymer is a fumaric acid modified metallocene polyethylene copolymer. Functionalized metallocene ethylene copolymer is available from Dow Chemical.

The functional groups in the functionalized metallocene ethylene copolymer are typically distributed randomly throughout the copolymer. Particularly preferred embodiments of the adhesive of the invention will comprise a functionalized metallocene polyethylene copolymer comprising from about 0.3 to about 8 wt %, more particularly about 0.5 to about 3 wt %, of the functional group, based on the weight of the non-functional metallocene polyethylene copolymer. Functionalized metallocene ethylene copolymer is available from Dow Chemical.

The functionalized metallocene polyethylene copolymer will typically be used in amounts of from about 10 wt % to about 60 wt %, more preferably from about 20 wt % to about 50 wt % as the main base adhesive polymer component. By "main" or "base" polymer component means the adhesive polymer component present in the largest amount of the adhesive. It will be appreciated that other polymeric additives may, if desired, be added to the adhesive formulation.

Functionalized metallocene polyethylene copolymer suitable for the invention will have molecular weight greater than 2000 daltons. The functionalized metallocene polyethylene copolymer is different than functionalized modified wax. A skilled artisan understands that functionalized modified wax typically has molecular weight less than 2000 daltons.

In addition to functionalized metallocene polyethylene copolymer, the adhesive may also optionally comprise other compatible non-functionalized metallocene polyethylene copolymers and/or other ethylene copolymers such as ethylene vinyl acetate (EVA), ethylene n-butyl acrylate (EnBA) and ethylene ethyl hexyl acrylate (EEHA). A compatible ethylene polymer is defined herein as any polymer that has the ability to mix with the functionalized metallocene polyethylene copolymer without objectionable separation, i.e., without adversely affecting the performance of the formulated adhesive. Examples of compatible non-functionalized metallocene polyethylene copolymers include for example, Dow Chemical's Affinity polymers. When such additional polymer is present, it is present in amounts of up to about 30 wt %, preferably up to about 20 wt %, by weight of the adhesive composition.

The adhesive compositions of this invention are preferably tackified. The tackifier component will usually be present in an amount of from about 10 wt % to about 60 wt %, more preferably from about 20 wt % to about 50 wt %, even more preferably from about 20 wt % to about 45 wt %. The tackifying resins typically will have Ring and Ball softening points, as determined by ASTM method E28, of between about 70° C. and 150° C., more typically between about 90° C. and 135° C., and most typically between about 95° C. and 130° C. Mixtures of two or more tackifying resins may be desirable for some formulations.

Useful tackifying resins include any compatible resin or mixtures thereof such as natural and modified rosins including, for example, gum rosin, wood rosin, tall oil rosin, distilled rosin, hydrogenated rosin, dimerized rosin, resinates, and polymerized rosin; glycerol and pentaerythritol esters of natural and modified rosins, including, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Also included are the cyclic or acyclic $C_5$ resins and aromatic modified acyclic or cyclic resins. Examples of commercially available rosins and rosin derivatives that could be used to practice the invention include SYLVALITE RE-110, SYLVARES RE 115, SYLVARES RE 104 and SYLVARES ZT 106 available from Arizona Chemical; Dertocal 140 from DRT; Limed Rosin No. 1,GB-120, and Pencel C from Arakawa Chemical. Examples of commercially available phenolic/aromatic modified terpene resins are Sylvares TP 2040 HM, Sylvares ZT-106, and Sylvares TP 300, available from Arizona Chemical.

In some embodiments, the tackifiers are synthetic hydrocarbon resins. Included synthetic hydrocarbon resins are aliphatic or cycloaliphatic hydrocarbons, aromatic hydrocarbons, aromatically modified aliphatic or cycloaliphatic hydrocarbons and mixtures thereof. Also included are hydrogenated versions of the above mentioned synthetic hydrocarbon resins.

Non-limiting examples include aliphatic olefin derived resins such as those available from Goodyear under the Wingtack® Extra tradename and the Escorez® 1300 series from Exxon. A common $C_5$ hydrocarbon derived tackifier resin in this class is a diene-olefin copolymer of piperylene and 2-methyl-2-butene having a softening point of above 95° C. This resin is available commercially under the tradename Wingtack 95. Eastotac H115 (available from Eastman Chemical), a hydrogenated cyclopentadiene-based tackifier with a softening point of about 100 to about 120° C. is a particularly preferred tackifier.

Also useful are $C_9$ aromatic modified $C_5$ hydrocarbon derived tackifiers. Such tackifiers are available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-110° C. and is commercially available from Cray Valley.

Small quantities of alkyl phenolic tackifiers can be blended with additional tackifier agents such as those detailed above to improve the high temperature performance of these adhesives. Alkyl phenolics added in less than 20 wt % of the total formulation are compatible and in the proper combination increase high temperature adhesive performance. Alkyl phenolics are commercially available from Arakawa Chemical under the Tamanol tradename and in several product lines from Schenectady International.

Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes. Modified waxes, including vinyl acetate modified waxes such as AC-400 (Honeywell) and MC-400 (available from Marcus Oil Company), maleic anhydride modified waxes such as Epolene C-18 (available from Eastman Chemical) and AC-575A and AC-575P (available from Honeywell) and oxidized waxes are also useful in the practice of the invention. Callista® 122, 158, 144, 435, and 152 available from Shell Lubricants, Houston, Tex.; Paraflint®C-80 and Paraflint®H-1, H-4 and H-8, Fischer-Tropsch waxes available from Sasol-SA/ Moore&Munger, Shelton, Conn. are also preferred waxes for use in the practice of the invention.

Paraffin waxes that can be used in the practice of the invention include Pacemaker® 30, 32, 35, 37, 40, 42, 45 & 53 available from Citgo Petroleum, Co., Houston, Tex.; Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, Conn.; and Paraffin Wax 1297 available from International Waxes, Ltd. in Ontario, Canada; R-2540 available from Moore and Munger; and other paraffinic waxes such as those available from CP Hall under the product designations 1230, 1236, 1240, 1245, 1246, 1255, 1260, & 1262, available from CP Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melt point wax available from Bareco in Chicago, Ill.; Okerin® 177, an 80° C. melt point wax available from Astor Wax Corp.; Besquare® 175 and 195 Amber Waxes and 80° C. and 90° C. melt point microcrystalline waxes both available from Petrolite Corp. in Tulsa, Okla.; Indramic® 91, a 90° C. melt point wax available from Industrial Raw Materials located in Smethport, Pa.; and Petrowax® 9508 Light, a 90° C. melt point wax available from Petrowax Pa., Inc. located in New York, N.Y.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm$^3$, and a melting point of approximately 126° C.

Wax will typically be present in the formulations of the invention in amounts of from about 5 to about 60 wt %, more preferable from about 10 to about 45 wt %, and even more preferable from about 20 to about 40 wt %. Preferred waxes have a melt temperature between 120° F. and 250° F., more preferably between 150° F. and 230° F., and most preferable between 180° F. and 220° F.

It has now been discovered that functionalized metallocene polyethylene copolymers show better compatibility with a broader range of substances than non-functionalized metallocene polyethylene copolymers and may be used to prepare low application temperature adhesives having good performance properties.

The adhesives of the present invention may if desired also contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments, dyestuffs and fillers conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10% by weight, into the formulations of the present invention.

Particularly preferred embodiments of the adhesive of the invention will comprise from about 20 to about 40 wt % of a functionalize metallocene polyethylene copolymer, from about 20 to about 40 wt % of a wax and from about 20 to about 40 wt % of a tackifier.

The adhesive compositions of the present invention are prepared by blending the components in the melt at a temperature of above about 200° F., typically at about 280° F. until a homogeneous blend is obtained. Two hours is usually sufficient. Various methods of blending are known in the art and any method that produces a homogeneous blend is satisfactory.

The adhesives may desirably be formulated for application at low temperatures, i.e., formulations that can be applied at temperatures of about 200° F. to about 300° F., more typically at about 250° F. to provide hot melt adhesives possessing excellent heat stress and cold adhesion.

The adhesive compositions of the present invention typically have a viscosity range of about 700 cP to about 2000 cP at 250° F.

Adhesives contemplated for pre-application to a substrate surface and then later reactivated to enable the substrate comprising the reactivated adhesive to be bonded to a second substrate may desirably contain an ingredient to facilitate reactivation. Preferred reactivatable adhesives are formulated to reactivate upon exposure to short durations of radiant energy. In this embodiment, the adhesive contains an energy-absorbing ingredient, such as, for example, dyes and pigments, near infrared absorbing dyes and pigments being particularly preferred.

Adhesives can also be formulated for reactivation using ultrasonic energy. Preferred adhesives will reactive upon exposure to ultrasonic energy having a frequency of from about 15 kilohertz to about 40 kilohertz. Substrates to be bonded are brought together with the adhesive sandwiched there between and pressed against an ultrasonic horn with booster.

The hot melt adhesives of the present invention are particularly useful in case sealing applications where exceptionally high heat resistance in addition to cold resistance is important, i.e., in hot filled packaging applications; e.g. sealing and closing operations for cartons, cases, or trays used in packaging molten cheese, yogurt or freshly baked goods which are subsequently subjected to refrigeration or freezing, and for corrugated cases, which are often subjected to high stresses and adverse environmental conditions during shipping and storage.

The hot melt adhesives of the invention find use in packaging, converting, cigarette manufacture, bookbinding, bag ending and in nonwoven markets. The adhesives find particular use as case, carton, and tray forming adhesives, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed. The adhesive is also particularly useful in the manufacture of nonwoven articles. The adhesives may be used as construction adhesives, as positioning adhesives, and in elastic attachment applications in the manufacture of, e.g., diapers, feminine hygiene pads (which include conventional sanitary napkins and panty liners) and the like.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

The following examples are provided for illustrative purposes only. All parts in the formulation are by weight.

EXAMPLES

Example 1

Adhesive Samples 1-6 and Comparative Adhesive Sample A-C were prepared in a single blade mixer heated to 285° F. by mixing the components shown in Table 1 and 2 together until homogeneous.

TABLE 1

|  | Sample 1 | Sample 2 | Sample 3 | Sample 4 | Sample 5 | Sample 6 |
|---|---|---|---|---|---|---|
| Maleic anhydride functionalized metallocene polyethylene copolymer[a] | 32 | 32 | 32 | 33 | 33 | 33 |
| Tackifier 1[b] | 35 | 36 | 26 |  | 37 |  |
| Tackifier 2[c] |  |  | 10 |  |  | 17 |
| Tackifier 3[d] |  |  |  | 37 |  | 20 |
| Wax 1[e] | 33 |  |  | 30 | 30 | 30 |
| Wax 2[f] |  | 32 | 32 |  |  |  |
| Total | 100 | 100 | 100 | 100 | 100 | 100 |

[a]1-1.5 wt % of maleic anhydride functionalized metallocene polyethylene copolymer, Dow Chemical
[b]SYLVARES ZT 106, Arizona Chemical
[c]SYLVALITE RE-100L, Arizona Chemical
[d]Eastotac H-115R, Eastman Chemical
[e]CALLISTA ® 158 wax, Shell
[f]Pacemaker ® 53, Citgo

TABLE 2

|  | Sample A | Sample B | Sample C |
|---|---|---|---|
| Non-functionalized metallocene Polyethylene copolymer[g] | 32 | 28 | 28 |
| Maleic anhydride modified wax1[h] |  | 10 |  |
| Maleic anhydride modified wax2[i] |  |  | 15 |
| Tackifier 1[b] | 35 | 30 | 30 |

TABLE 2-continued

|  | Sample A | Sample B | Sample C |
|---|---|---|---|
| Wax 1[e] | 33 |  | 27 |
| Wax 3[j] |  | 32 |  |
| Total | 100 | 100 | 100 |

[g]Affinity GA, Dow Chemical
[h]Epolene C-18, Eastman Chemical
[i]A-C 573A, Honeywell
[b]SYLVARES ZT 106, Arizona Chemical
[e]CALLISTA ® 158 wax, Shell
[j]150F Paraffin wax, Citgo Example 2

Samples 1-6 and Comparative Samples A-C were subjected to the tests described below.

Melt viscosities of the hot melt adhesives were determined on a Brookfield Thermosel viscometer using a No. 27 spindle.

Adhesion at room temperature and 40° F. was determined by applying a ½" wide bead of adhesive at 250° F. to a 2"×3" piece of double fluted corrugate board, and immediately bringing a second piece of corrugated board into contact to form a bond. A 200 gram weight was immediately placed on the top of the bond for 2 seconds to provide compression. The specimens prepared were conditioned at room temperature for overnight and then placed in oven or refrigerators at different temperatures for 24 hours. The bonds were separated by hand and the resulting fiber tear was recorded.

Heat stress is defined as being the temperature at which a stressed bond fails. Two different sets of heat stress test were measured: heat stress test A and heat stress test B.

Heat stress test A was measured by forming a composite construction of adhesive (2×½" compressed) between two pieces of corrugated paperboard of specific dimensions. At least two measures were taken. The adhesive bead forming this composite is then placed under approximately 300 grams of cantilever stress for 8 hours and 24 hours at 135° F., 140° F. and 145° F. The test results were recorded as pass (both bonds passed (P)), fail (both bonds failed (F)) or split (one bond passed and the other one failed (S)).

Heat stress test B was performed similarly to heat stress test A, but with approximately 96 grams of cantilever stress for 24 hours at 105° F., 110° F. and 115° F.

The color of the adhesives and the cloud points were also noted.

Results of the tests described above are shown in Table 3 and 4.

TABLE 3

|  | Sample 1 | Sample 2 | Sample 3 | Sample 4 | Sample 5 | Sample 6 |
|---|---|---|---|---|---|---|
| Adhesion (% tear) |  |  |  |  |  |  |
| Room Temp. | 100, 100 | 100, 95 | 95, 95 | 100, 100 | 100, 100 | 100, 100 |
| 40° F. | 90, 90 | 95, 95 | 100, 95 | 100, 100 | 100, 95 | 100, 100 |
| Viscosity @ 250° F. (cp) | 1225 | 1165 | 1080 | 1905 | 1645 | 1580 |
| Heat stress test A |  |  |  |  |  |  |
| 135° F./8 hours | P | P | P | P | P | P |
| 135° F./24 hours | P | S | S | P | P | P |

TABLE 3-continued

|  | Sample 1 | Sample 2 | Sample 3 | Sample 4 | Sample 5 | Sample 6 |
|---|---|---|---|---|---|---|
| 140° F./8 hours | P | S | S | S | P | P |
| 140° F./24 hours | P | F | F | F | P | P |
| 145° F./8 hours | S | — | — | F | P | S |
| Heat stress test B |  |  |  |  |  |  |
| 105° F./24 hours | P | P | P | P | P | P |
| 110° F./24 hours | P | S | S | P | P | P |
| 115° F./24 hours | — | — | — | P | P | F |

TABLE 4

|  | Sample A | Sample B | Sample C |
|---|---|---|---|
| Adhesion (% tear) |  |  |  |
| Room Temp. | 100, 95 | 80, 40, 40 | 80, 80, 80 |
| 40° F. | 85, 90 | 85, 80, 90 | 85, 90, 85 |
| Viscosity @250° F. (cp) | 730 | 820 | 820 |
| Heat stress test A |  |  |  |
| 135° F./8 hours | F | F | S |
| 135° F./24 hours | F | F | F |
| 140° F./8 hours | F | F | F |
| 140° F./24 hours | F | F | F |
| 145° F./8 hours | F | — | — |
| Heat stress test B |  |  |  |
| 105° F./24 hours | F | F | F |
| 110° F./24 hours | F | F | F |
| 115° F./24 hours | — | — | — |

From the result it is clear that functionalized metallocene polyethylene copolymer based adhesive (Samples 1-6) possess much better heat stress than non-functionalized metallocene polyethylene copolymer based adhesive comparative Samples A-C when applied at a low temperature of 250° F. The results also indicated that functionalized metallocene polyethylene copolymer based adhesive (Samples 1-6) possess much better heat stress than adhesives made of functionalized modified wax and non-functionalized metallocene polyethylene copolymer (Comparative Samples B and C) when applied at a low temperature of 250° F.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A low application temperature hot melt adhesive comprising a functionalized metallocene polyethylene copolymer, a tackifier and a wax, wherein the polyethylene copolymer is prepared from ethylene and 1-octene monomers, the adhesive having a viscosity of from about 700 cP to about 2000 cP at a temperature of 250° F.

2. The adhesive of claim 1 wherein the functionalized metallocene polyethylene copolymer comprises a functional group selected from the group consisting of acrylic acid, acetate, sulfonate, maleic anhydride, fumaric acid and mixtures thereof.

3. The adhesive of claim 2 wherein the functional group is maleic anhydride.

4. The adhesive of claim 2 wherein the functional group is fumaric acid.

5. The adhesive of claim 2 wherein the functionalized metallocene polyethylene copolymer comprises from about 0.3 to about 8 weight % of a functional group, based on the weight of the non-functionalized metallocene polyethylene copolymer.

6. The adhesive of claim 5 wherein the functionalized metallocene polyethylene copolymer comprises from about 0.5 to about 3 weight % of said functional group based on the weight of the non-functionalized metallocene polyethylene copolymer.

7. The adhesive of claim 1 wherein the tackifier is selected from the group consisting of rosin modified tackifier, $C_5$ hydrocarbon derived tackifier, $C_9$ aromatic modified $C_5$ hydrocarbon derived tackifier and mixtures thereof.

8. The adhesive of claim 1 wherein the wax is selected from the group consisting of a paraffin wax, synthetic wax, microcrystalline wax and mixtures thereof.

9. The adhesive of claim 8 wherein the wax is a paraffin wax.

10. The adhesive of claim 8 wherein the wax is a synthetic wax.

11. The adhesive of claim 1 further comprising a filler, a plasticizer, a pigment, a dyestuff or a mixture thereof.

12. The adhesive of claim 1 further comprising a non-functionalized metallocene polyethylene copolymer.

13. A low application temperature hot melt adhesive composition comprising, based on the total weight of the composition,
  (a) from about 20 to about 50 wt % of a maleic anhydride modified functionalized metallocene polyethylene copolymer, wherein the polyethylene copolymer is prepared from ethylene and 1-octene monomers,
  (b) from about 20 to about 40 wt % of a wax; and
  (c) from about 20 to about 45 wt % of a tackifier,
  wherein said maleic anhydride modified functionalized metallocene polyethylene copolymer contains from about 0.3 to 8 weight %, based on weight of the non-functionalized metallocene polyethylene copolymer, of maleic anhydride functional group.

* * * * *